United States Patent [19]

Wittern et al.

[11] 4,364,511
[45] Dec. 21, 1982

[54] CLOSURE TIE FOR TUBES OF FILM MATERIAL FOR ENCLOSING FOOD, A METHOD OF FORMING THE TIE AND APPARATUS FOR CARRYING OUT THIS METHOD

[75] Inventors: Hans-Dieter Wittern; Fred Geyer, both of Weinheim, Fed. Rep. of Germany

[73] Assignee: Naturin-Werk Becker & Co., Fed. Rep. of Germany

[21] Appl. No.: 184,650

[22] Filed: Sep. 5, 1980

Related U.S. Application Data

[63] Continuation of Ser. No. 7,295, Jan. 29, 1979, abandoned.

[51] Int. Cl.$^3$ ............................................. B65D 33/28
[52] U.S. Cl. ...................................... 229/63; 53/424;
   53/417; 426/105
[58] Field of Search .................. 426/105; 248/328;
   229/63; 53/413, 417, 424

[56] References Cited

U.S. PATENT DOCUMENTS

| | | | |
|---|---|---|---|
| 1,967,992 | 7/1934 | Ellstrom et al. | 229/93 |
| 2,225,694 | 12/1940 | Freeman | 426/105 |
| 2,670,294 | 2/1954 | Frank | 426/105 |
| 3,041,801 | 7/1962 | Harrison | 53/37 |
| 3,479,788 | 11/1969 | Dreyfus | 53/33 |
| 3,497,131 | 2/1970 | Tracy | 229/66 |
| 3,620,774 | 11/1971 | Ford et al. | 229/63 |
| 3,635,738 | 1/1972 | Hofmann et al. | 426/105 |
| 3,922,398 | 11/1975 | Bridgeford et al. | 426/105 |
| 3,935,320 | 1/1976 | Chiv et al. | 427/105 |

FOREIGN PATENT DOCUMENTS

| | | |
|---|---|---|
| 628389 | 3/1936 | Fed. Rep. of Germany . |
| 648038 | 7/1937 | Fed. Rep. of Germany . |
| 674729 | 3/1939 | Fed. Rep. of Germany . |
| 810354 | 5/1951 | Fed. Rep. of Germany . |
| 896021 | 10/1953 | Fed. Rep. of Germany . |
| 1152936 | 2/1964 | Fed. Rep. of Germany . |
| 1778495 | 8/1964 | Fed. Rep. of Germany . |
| 1908571 | 10/1964 | Fed. Rep. of Germany . |
| 1995420 | 7/1968 | Fed. Rep. of Germany . |
| 1532023 | 4/1971 | Fed. Rep. of Germany . |
| 1507975 | 8/1971 | Fed. Rep. of Germany . |
| 1632109 | 1/1972 | Fed. Rep. of Germany . |
| 1803353 | 9/1973 | Fed. Rep. of Germany . |
| 2346134 | 9/1973 | Fed. Rep. of Germany . |
| 2226710 | 12/1973 | Fed. Rep. of Germany . |
| 1576781 | 8/1969 | France . |

*Primary Examiner*—Stephen P. Garbe
*Attorney, Agent, or Firm*—Brumbaugh, Graves, Donohue & Raymond

[57] ABSTRACT

A tube of film material for enclosing food has a closure tie with a suspension loop, the enclosure tie including the knot lying in a recess in the pleated tip of the film material. The recess in which the tie is located is formed by softening the tube by heating, for example, with warm air, infrared radiation, ultrasonic means, by previously heating the tie filament, or by treating the film material with solvents or softening agents. Apparatus is disclosed for carrying out the process.

12 Claims, 8 Drawing Figures

CLOSURE TIE FOR TUBES OF FILM MATERIAL FOR ENCLOSING FOOD, A METHOD OF FORMING THE TIE AND APPARATUS FOR CARRYING OUT THIS METHOD

This is a continuation of application Ser. No. 007,295 filed Jan. 29, 1979, now abandoned.

The invention relates to an improved closure tie for tubes of film material for enclosing and packing food, a method of forming the tie and apparatus for carrying out the method. Such tubes of film material are used in particular as sausage casings.

Closure ties are used in the trade at both ends of a tube of film material filled with material, e.g. the material forming a sausage, which seal is formed by means of a binding filament of natural material e.g. a hemp binding filament, or by means of a synthetic filament. To enable the filled tube of film material, e.g. the sausage, to be hung up, it is provided at one end with a loop which can be formed for example from the two ends of the binding knot, this being done by forming a simple loop knot approximately 10 to 15 cm above the closure tie. Tubes of film material, particularly synthetic casings for enclosing large-diameter sausages, to be cooked by scalding and boiling, are mostly sold today in pre-cut lengths with a mechanically formed closure tie incorporating a suspension loop. The end that is to be tied off is compacted in some suitable manner, e.g. by pleating, and the tie together with the suspension loop is laid around the compressed end. The portion of the compressed end that projects beyond the tie forms a tip. The second closure tie is formed by the butcher after the casing has been filled with sausage meat; this closure tie may be replaced by a metal clip.

Hereinafter, the term "closure tie" means the first-mentioned tie incorporating a suspension loop which is not only intended to close up the sausage casing but is also used for supporting the filled sausage during scalding in the cooking cabinet and during subsequent storage in the cold-storage room. In a filled tube of film material, e.g. a sausage cooked by scalding, that is hanging by a suspension loop, the tip of the sausage casing is thus located above the closure tie knot plus loop as formed in accordance with the invention and as defined above.

With foods of all kinds, particularly sausages, which are contained in a tube of film material and are processed and/or stored while suspended by a loop, there arises the problem that the tie knot may shift under the weight of the material in the casing, and in some circumstances it may even slide over the tip at the end of the film material. Under its own weight the filled tube of film material may slip completely through the closure tie and drop to the floor. Then, only the loop with the tie knot remains hanging from the hook.

The greater the weight of the filled tube of film material which is dependent upon length and diameter, the greater this problem becomes. Particularly with sausages, the present tendency is to increase their length so as to reduce that portion of the entire sausage that constitutes unsaleable chopped-off end pieces. Thus, sausages having a diameter of 130 mm and a length of 80 cm and weighing 8.5 kg are quite usual these days; however, there is also a demand for sausage casings having a length of 105 cm which, with a diameter of 110 mm, are required to accommodate material weighing approximately 8.5 kg. The danger of the closure tie slipping over the end of the tip and of the filled tube of film material falling to the ground will of course be influenced by the material of which the tube is made. If this is very smooth and flat and has no rough zones, the closure tie will become displaced considerably more easily than when use is made of a rough material, the irregularities in the surface of which to some extent tend to hold the tie. A smooth surface of this kind is possessed in particular by the tubular casings that are used on a large scale for containing sausages and other meat products and that are made of films of such materials as thermoplastic substances such as polyamides, polyesters and polyvinylidene chloride, and also fibre-reinforced regenerated cellulose such as softened regenerated cellulose, which are coated with thermoplastic materials.

The danger of slipping of the closure tie becomes greater in moist or wet conditions since the surface of the film material then becomes even smoother and more slippery. In the preparation of sausage and other meat products in particular, moisture is often present. Thus, sausages, processed by boiling and scalding, are often exposed to the action of hot water or steam while they are in the suspended position.

Furthermore, the danger of slipping of the closure tie and the suspension loop arises particularly while sausage casings are being filled. Here it is well known that the tube of film material, cut to the required length and already mechanically closed at the manufacturer's works by means of a closure tie incorporating a suspension loop, is gripped by the butcher, fitted by its open end over the charging funnel of a sausage-filling machine, and held in position manually. The tied-off end must withstand the pressure at which the sausage-meat is filled into the casing. During this operation the closure tie also often becomes displaced particularly when the cut lengths of casing each having a closure tie are dipped in hot water just prior to filling so that the surface becomes very smooth.

The above-described difficulties, which it has not yet been possible to overcome, stem from the fact that, particularly with large-diameter tubes of film materials having a very smooth surface, such as thermoplastic materials, it has not been possible to apply the closure ties so tightly around the tip of the tube that the knot is prevented from slipping during filling or subsequent treatment such as the boiling or scalding to which the filled tube of film material is subjected in the suspended position. The degree to which the closure tie can be tightened is limited by the breaking strength of the filament used for the purpose.

The following are the two main methods that have so far been used in attempts to solve the above-described problem:

1. The closure tie is held in position with the aid of a metal ring pushed through the end of the sausage casing after the tie has been formed. The metal ring forms an extra thickness in the tip of the sausage casing over which the closure tie is unable to slide.
2. It is also known to secure the closure tie in position by fitting a metal clip around the tip immediately above the tie. This metal clip generally also surrounds the supporting loop of the closure tie and therefore also transmits most of the tensile force so that the closure tie is relieved of load. Thus, when a clip is used for fixing purposes, considerably greater forces can be applied than when the closure tie is simply formed by means of a filament. When working both with manually operated lever apparatus and pneumatically powered clip-applying machines, the clip is pressed around the tip of the sausage under a lever force of 50 to 75 kg, whereas a customary hemp yarn can only be drawn tight using a force lower than that at which it will break, i.e. a force of approximately 20 to 30 kg as specified in German Standard DIN 55 834. It is therefore quite possible to anchor the metal clip so firmly on the tip of the casing of thermoplastic film that it is able to withstand the loads occurring in the boiling cabinet even when the weight is great (e.g. in the case of heavy sausages), whereas it is not possible to draw a filament tie so firmly that it can withstand such loads. The closure tie employing a filament alone is adequate for a sausage-casing material having a relatively rough surface, such as for example hardened collagen sausage casing and sausage casings made of fibre-reinforced regenerated cellulose which are not externally coated with a thermoplastic material such as for example polyvinylidene chloride. However, difficulties arise with sausages weighing more than 2 kg having casings of thermoplastic materials, and with fibre-reinforced regenerated cellulose sausage casings externally coated with thermoplastic material, because of the compactness of the pleated casing tip and the smoothness of the casing material. The pleating or crimping of the upper end of the sausage casing results in a very compact tip of approximately square cross-section and of such strength that the filament cannot become pressed into a groove and remain fixed therein as it would if applied for example to a canvas bag.

The object of the present invention is therefore to provide a non-slip closure tie for tubes of film material used for enclosing and packing foods of all kinds, particularly sausage casings for large-diameter heavy sausages processed by scalding and boiling.

A further object of the invention is to permit the formation of such a non-slip closure tie in a simple and economical manner on a modern mass-production tie-forming machine without the use of additional material for clips, rings or the like and without the expenditure of additional time that would be required for providing these latter elements.

According to the invention, this object is achieved by having the tie knot incorporating a suspension loop disposed in a recess in the compressed end of the tube of film material that is to be tied off.

The subject-matter of the invention is therefore a tube of film material for enclosing food and having a closure tie plus suspension loop, which tube is characterized in that the tie knot is disposed in a recess in the compressed end that is to be tied off. The end to be tied off is preferably pleated.

The recess or constriction in the end to be tied off either extends as an annular groove over the entire periphery, or covers only portions of the periphery.

Primarily, suitable materials for the film of which the tube is made are thermoplastic materials, e.g. polyamides, polyesters and polyvinylidene chloride mixed polymers, but use may also be made of fibre-reinforced films of regenerated cellulose coated with a thermoplastic material, and also films of regenerated cellulose which, if softened with a plasticizer, behaves like a thermoplastic material.

Suitable closure tie materials are filaments of spun and optionally twined natural fibres such as hemp, flax or sisal or mixtures of these materials, as well as filaments or wires of plastic materials, for example, drawn polyethylene, polypropylene, polyamide or polyester. It is preferred to use closure tie materials having a breaking strength of at least 20 kg as specified in German Standard DIN No. 55 834.

The invention is also concerned with a method of forming this closure tie that is characterized in that the zone where the tie is to be made is softened before, during or after the forming of the tie knot. In this way the film material is caused to yield sufficiently to enable the tie filament to form a constriction or recess while it is being wound round and drawn tight, the tie knot moving into this recess so that the closure tie is prevented from sliding off the tip of the tube of film material.

In a preferred arrangement, the point where the tie is to be formed is softened by heating and caused to yield. Heating can be carried out in various ways, for example, by means of hot air, the hot combustion gases provided by a gas flame, or superheated water vapor, but for the purposes of the invention it is preferred to carry out heating by a blast of hot air having a temperature of approximately 150° to 250° C. If, for example, a polyamide is used, an air temperature of 150°-160° C. is sufficient. Surprisingly, a very brief heating before or during the application of the closure tie suffices to fix the knot with its suspension loop so that it becomes completely non-slip and the knot withstands the heaviest of loads during filling and/or boiling and scalding.

The heating of the zone where the closure tie is to be made may also be carried out by ultrasonic means or by infrared radiation.

Finally, it is also possible to soften the zone where the tie is to be made by means of the preheated tie filament.

If the zone of the tie is heated only after the closure tie has been formed, the knot embeds itself more deeply into the softened surface of the film material. In this case it may be advantageous also to press the formed knot into the tip of the sausage casing, during or after heating, by the application of pressure, the tip being simultaneously deformed so that its cross-section is changed from a square to a rectangle. The periphery of the rectangular cross-section is preferably 0.05 to 0.2 times greater than that of the previous square cross-section.

The zone where the tie is to be formed can be plasticized by some suitable method other than heating, e.g. by the action of a solvent and/or a swelling agent suited to the particular film material used. Thus, for example, prior to pleating, the film material can be softened to such an extent with a suitable solvent, e.g. chloroform, that subsequent tightening of the tie filament results in the formation of a constriction.

The invention is also concerned with apparatus for carrying out the method, which apparatus can be fitted as a whole and in a simple manner on mass-production machines for forming closure ties. A suitable mass-production machine for forming closure ties which can be used for the purpose of this invention is for example the type ZD 1, shown in "Die Fleischwirtschaft," No. 4, April 1975, on the cover page, manufactured by VEB Verpackungsmaschinenbau Dresden, GDR.

One very simple apparatus consists of a compressed-air source, a means for electrically heating the compressed air, elements for regulating the compressed air and the heat, and supply ducts running from the compressed air source to the pleated tube end to be heated, and is characterized in that the compressed air flows from at least two pipes or nozzles which are so disposed in relation to the pleated tube end that the hot air is blown between the folds of the tip.

A further apparatus for carrying out the invention consists of a compressed-air operated indenting tool having an electrical or ultra-sonic heating device for the lower part of the tool, and is characterized in that the working surfaces of the lower and upper parts of the tool are substantially semi-circular or V-shaped and together form a gap of circular, elliptical, square, rhombic or rectangular cross-section in which the tip of the sausage casing lies during indentation. In a preferred form of this apparatus, the working surfaces have a ridge of semi-circular cross-section whereby a peripheral groove, 0.5 to 1 mm in depth and of approximately similar width, can be impressed in the tip of the sausage casing.

In a further form of apparatus, the indenting tool which is moved by compressed air and is equipped with an ultrasonic generator for the male part, also has opposite pressing surfaces by means of which the tie knot is pressed into the tip of the tube, the entire tip being at the same time deformed so that a rectangular cross-section is imparted thereto.

Further details of the invention will be described by reference to the attached drawings. The closure ties in accordance with the invention offer the advantage that they can be formed using normal modern tie-forming machines after suitable simple devices have been fitted thereto, without reducing the normal machine capacity of 25 to 30 pieces per minute and without the need for further manual work.

In the preferred embodiment of the invention, the pleated and compressed end of the tube of film material, which is held by tongs below the zone where the closure tie is to be formed, is heated with hot air and the filament is passed round the tip, knotted and tightened, the loop of the knot lying in a groove, 0.3 to 0.5 mm deep, from which it cannot slide. No additional material at all is necessary for this purpose, whereas in the prior art systems a clip or ring of light metal has to be fitted in a separate operation in order to achieve a comparable resistance to slip and loadability of the looped and knotted filament. Apart from the fact that clips and rings cost 0.6 to 1.3 German pfennings each, their use involves labor costs of more than 2.5 German pfennings each, which figure represent a considerable additional proportion of the total costs.

The invention will now be explained by reference to the drawings and in the description of the method.

FIG. 1 shows a pleated sausage casing 5, which is held by jaws 1 and 2 and the tip 6 of which is acted upon by a blast of hot air supplied through two small pipes 3 and 4 disposed respectively one above and one below the tip 6.

FIG. 2 shows the same sausage casing 5 after it has been provided with a closure tie 7 incorporating a suspension loop 8.

Figure 1:
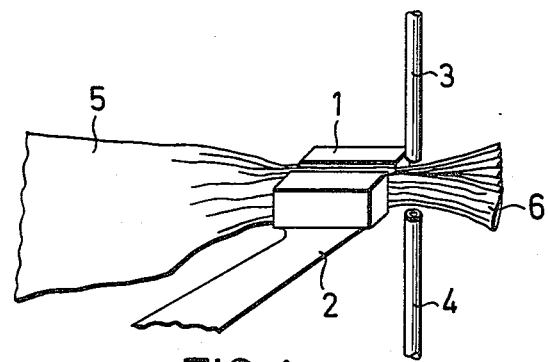
Figure 2:
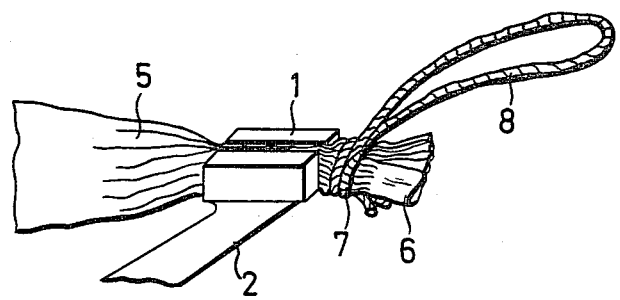
Figure 3:
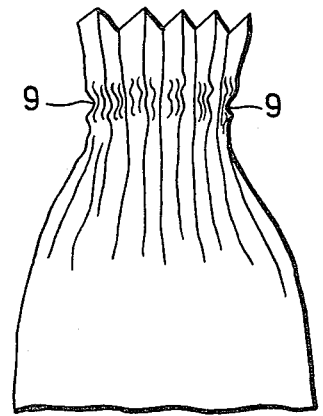
FIG. 3 shows a sausage casing after removal of the tie which had laid in the groove 9.

A slide 12 carries at one end a compressed-air cylinder with a piston 13, which can be acted on at both ends, and a piston rod carrying the upper part 14 of the tool, while at its other end the slide 12 carries the lower part 15 of the tool. The upper and lower parts are each provided with a high-duty heating cartridge 16.

Figure 4:
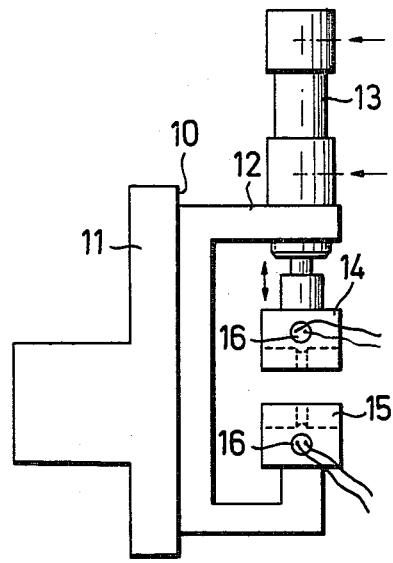
FIG. 4 shows a compressed-air tool which has a slide face 10 whereby the tool can be slide on a guide 11.
Figure 5:
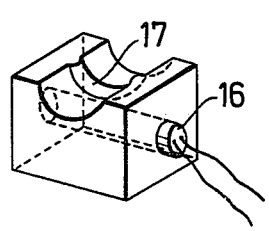

FIG. 5 shows the lower part 15 of the tool turned through 90° from its FIG. 4 position so that a rim 17 on the working surface can be seen.

Figure 6:
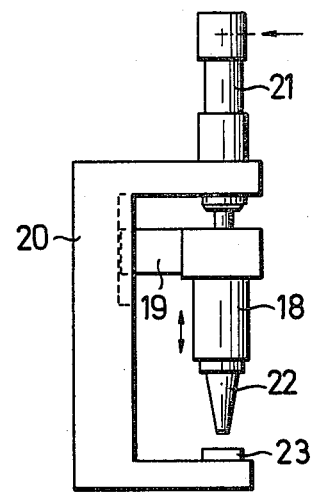

FIG. 6 shows an ultrasonic tool 18 which is mounted by means of a slide 19 in a guide 20 and is held by a spring (not shown) against an upper abutment.

Mechanical drive means 21 enable the tool to be lowered into its working position and the necessary shaping force to be applied. The ultrasonic vibrator carries a ram 22 having a planar working surface, 1 cm$^2$ in area, and acts in the direction of a planar support 23.

Figure 7:
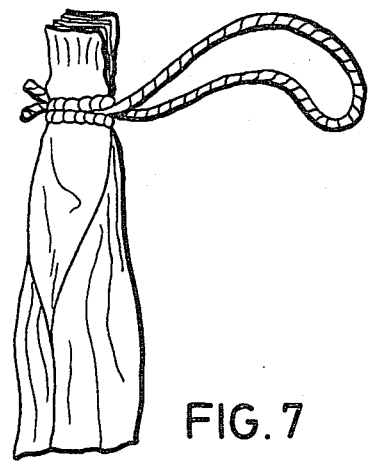

FIG. 7 shows the tip of a sausage casing that has been deformed by the ultrasonic tool shown in FIG. 6, this tip having a widened zone above the closure tie.

Figure 8:
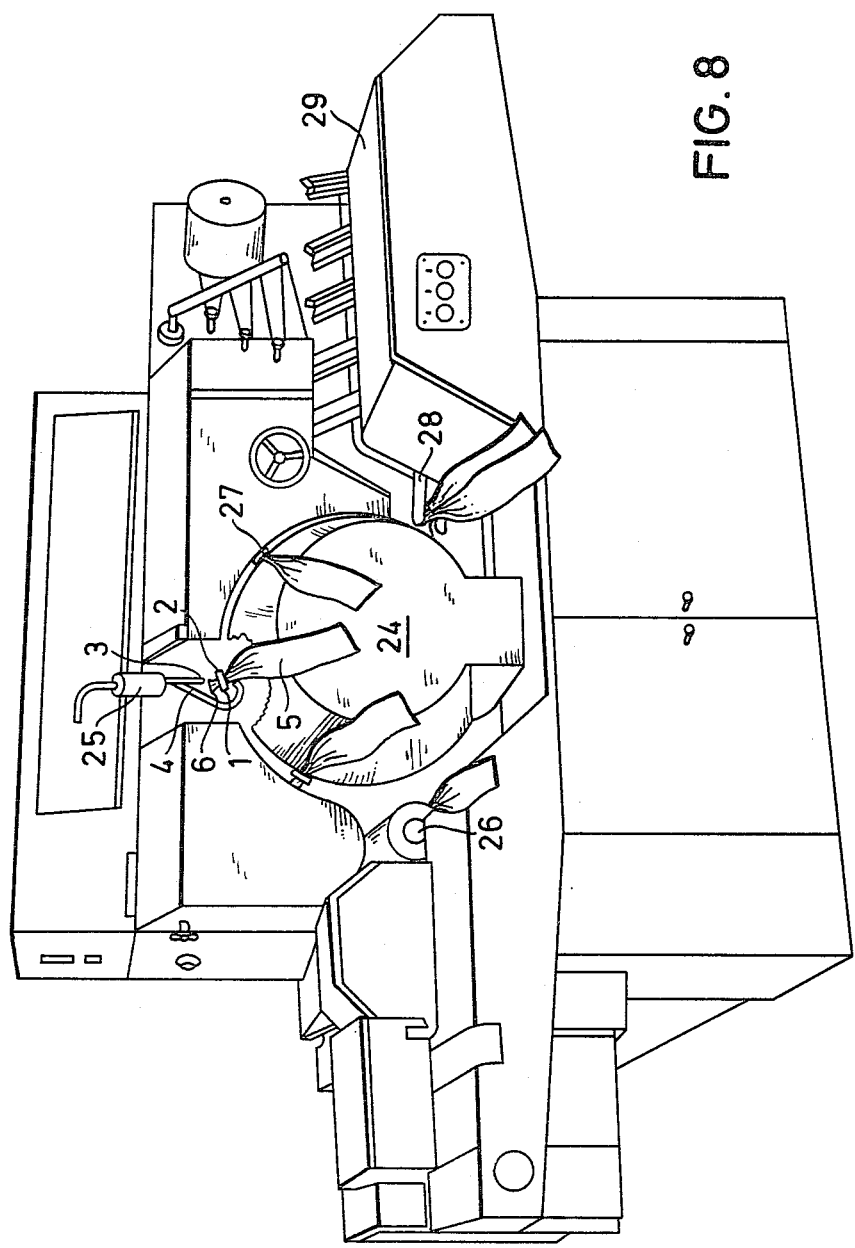

FIG. 8 shows a customary tying machine fitted with one apparatus for providing a closure tie according to the invention. This tying machine works with a revolving head, mounted behind the guard plate 24, equipped with 6 equal pairs of clamps which move stepwise along the 6 stations on the circle, stopping for about 2 seconds at each station.

In FIG. 8 the tying machine is provided with means for supplying hot air by two pipes 3 and 4 connected with a compressed-air source not shown, the compressed air being heated by an electrical resistance heater 25.

In forming the closure tie the end portion of the casing is pleated by a pair of pleating rollers 26. The pleated casing is seized by the clamps 1 and 2 which transfer it in two steps to the heating position, where the pleated end is subjected for about 2 seconds to heating by the hot air and is then transferred to the tying station 27. There the preformed tie is laid around the heated end portion of the casing and tightened. The closed casings are collected to five peaces by the forks 28 and removed by the operator on the table 29.

EXAMPLE 1

A mass-production machine for forming closure ties on sausage casings was fitted with apparatus for supplying hot air through two small pipes 3 and 4 having a diameter of approximately 5 mm, so that the pleated tip 6 of the end portion 5 of the casing, held by the jaws 1 and 2 of the feed device, could be softened at the zone where the tie is to be formed.

After the end portion 5 of a polyamide-12 casing, pleated in the previous work cycle carried out by the tie-forming machine, had been gripped by the jaws 1 and 2, said portion 5 was advanced toward the hot-air pipes 3 and 4 and was subjected for just 2 seconds to the action of hot air at a temperature of 150° to 160° C., this representing one machine cycle. In the following cycle the heated tip was advanced to the tying station where the previously formed tie incorporating a suspension loop was pushed over the hot tip 6 and drawn tight.

EXAMPLE 2

A compressed-air operated indenting tool (see FIG. 4) was fitted to a normal tie-forming machine. The upper part 14 and the lower part 15 of the tool could be brought to a temperature high enough to obtain a permanent deformation of the casing material. This temperature usually lies considerably below the softening temperature and is generated with the aid of an adjustable electrical heating device 16. The working faces of the lower and upper parts were of semi-cylindrical shape and, in the working position, together formed a ring, 10 mm deep and 6 mm in diameter, which closely enclosed the tip 6 of the sausage casing. The working surfaces were provided with a ridge 17, 0.5 mm high and 1.5 mm wide, and were coated with polytetrafluoroethylene. The entire tool was mounted on a slide parallel to the working direction with a clearance of 5 mm, so that it automatically centered itself around the tip of the sausage casing.

After the pleated end portion 5 of a thermoplastic sausage casing of a polyvinylidene-polyvinyl copolymerisate had gripped by the jaws 1 and 2 in the previous work cycle, it was moved into a position between the indenting apparatus (FIG. 4) heated to a temperature of 100° C. This apparatus was closed on to the tip above the jaws for approximately 1 second, and impressed therein a peripheral groove, approximately 0.5 mm deep and 1.5 mm wide. The tool then opened again thus completing the machine cycle. In the following cycle the tip was moved to the tying station where the previously prepared tie incorporating a suspension loop was pushed over the end 6 and drawn tight. The tie then layd in the preformed groove from which it could not move.

EXAMPLE 3

An ultrasonic apparatus (FIG. 6) was fitted on a normal tie-forming machine in such a way that the knotted ties formed by the machine could be subjected to ultrasonic deformation following the previous cycle of operations. The ultrasonic vibrator was provided with the usual devices for controlling the duration and strength of the pulses, and the pulses were automatically triggered off by the start of the operating cycles of the tie-forming machine while the apparatus was being lowered into the working position by mechanical drive means.

After the tie knot has been drawn tight around the tip of a polyester sausage casing in the previous operating cycle, the tip was moved into the ultrasonic apparatus and placed on the support 23. The vibrator with the ram 22 was then lowered by the air cylinder 21 and switched on at the same time. The ultrasonic energy heated up the end of the sausage casing in about 1 second to such an extent that sufficient softening occurred to enable the tie to be pressed into the tip of the sausage casing and for the tip to be pressed flat to a thickness of less than 2 mm and a width of 9 to 11 mm.

EXAMPLE 4

A normal machine for forming closure ties on sausage casings was provided with apparatus which permitted the flattened-out tube of film material to be moistened with a suitable mixture of solvent and/or swelling agents over a length of 1 cm in the zone where the tie was to be provided, this moistening taking place while the tube was being cut to length. The apparatus operates like an inking pad which is disposed in front of the impact-type cutting blade and is simultaneously with the blade.

After the endless tube of polyamide-11 film material had been advanced in the first working cycle, a length thereof was cut off by the blade and at the same time the moistening device was pressed onto the tube of film material at a distance of 1–2 cm from the blade and moistened with chloroform. During the period of 6 seconds which is equivalent to 3 working cycles, the solvent has time to cause the film material to swell, this, in the meantime, having been pleated and having reached the tying apparatus. The tie was then applied and tightened using the greatest possible tensile force.

TESTING OF THE CLOSURE TIE OF THE INVENTION UNDER CONDITIONS APPROXIMATING THOSE ENCOUNTERED IN PRACTICE

Closure ties for sausage casings prepared in the manner described in Examples 1 to 3 were subjected, in the sausage factory, to various severe tests intended to confirm the strength of the ties secured in the manner proposed by the invention.

1. The sausage casings with the closure ties plus suspension loops formed as in Examples 1 to 3 were filled with sausage-meat on a filling press:

The butcher pulled the sausage casing over the filling tube so that its end which was closed by the tie layd against the opening of the filling tube, and he started up the pump for supplying the sausage meat by means of a knee lever. With one hand he held the sausage casing on the filling tube and with the other he held the sausage as it became filled. The pressure in the sausage casing was determined by the force used by the butcher to retain the sausage casing on the filling tube.

The closure ties secured in position in the manner proposed in the invention could not be displaced along the tip of the sausage casing even under pressure of this magnitude. For purposes of comparison, sausage casing closure ties formed in accordance with German Patent Specification No. 1 803 353 and ties secured with a metal ring were tested. All of these also withstood the filling pressure. The knotted tie secured by a ring slid along the tip until it layd against the ring. Ties formed without securing means did not withstand this filling pressure test when provided on the tips of sausage casings made of thermoplastic film material.

2. Sausage casings of various diameters and lengths and having closure ties incorporating suspension loops and formed as in Examples 1 to 3 were filled with sausage meat, were closed with a metal clip and underwent a modern scalding process as approved by the trade. Irrespective of their lengths, the sausages were hung by their loops in the cooking compartment at a temperature of 72° to 78° C. in a water-vapor-saturated atmosphere for a number of minutes equal to the number of millimeters of their diameter, this being the normal criterion for determining the duration of treatment.

The following Table gives details of the closure ties tested and the dimensions of the sausages.

| Closure tie | Sausage casing material | Dimensions dia. in mm × length in cm | Weight in kg |
| --- | --- | --- | --- |
| as in Example 1 | Polyamide 12 | 130 × 80 | 8.5 |
| | Polyvinylidene chloride | 90 × 50 | |
| | Polyester | 115 × 50 | 3.6 |
| | Regenerated cellulose | 75 × 50 | |
| | Cellulose-fibre casing with internal coating of polyvinylidene chloride | 90 × 50 | |
| | Cellulose-fibre casing without inner coating of polyvinylidene chloride | 90 × 50 | |
| as in Example 2 | Polyamide 12 | 130 × 80 | 8.5 |

| Closure tie | Sausage casing material | Dimensions dia. in mm × length in cm | Weight in kg |
|---|---|---|---|
| as in Example 3 | Polyvinylidene chloride | 90 × 50 | 2.3 |
| | Regenerated cellulose | 75 × 50 | |
| | Polyamide 12 | 90 × 50 | 2.2 + 5*) |
| | Polyester | 115 × 50 | |

Six lengths of each of the sausage casings, against which the weights are shown, were subjected to scalding treatment in the cooking compartment in the manner described in paragraph 2 above. The sausages marked with an asterisk were additionally loaded with a 5 kg weight attached to the lower tip so that a total weight of over 7 kg was applied to the upper tip of the sausage. All of the sausages so treated withstood the test without the tie slipping to any appreciable extent. The other sausage casing materials were submitted only to the filling pressure test described in paragraph 1 above.

We claim:

1. A tube of film material having a closed end for enclosing food and having a closure tie at said closed end, said tie being situated in a permanently, thermoplastically deformed groove-like recess in said film material, which tube is made of a thermoplastic or thermoplastic-like material, wherein:
   (1) the closed end is formed by gathering the tube in a region to be closed by said closure tie;
   (2) the gathered thermoplastic material is softened in the region where said closure tie is to be applied;
   (3) the gathered plastic is permanently deformed by pressure while in the softened condition to form said groove-like recess, and thereafter allowed to harden; and
   (4) said closure tie is firmly engaged within the said groove-like recess, formed in the gathered plastic by softening, deforming, and allowing to harden, whereby said closure tie will not slip from the gathered plastic under tension.

2. A tube of film material according to claim 1, characterized in that the film material consists of polyamides, polyesters and/or polyvinylidene chloride mixed polymers.

3. A tube of film material according to claim 1, characterized in that the closure tie material is a filament of natural fibres, preferably hemp, flax, sisal or mixtures thereof.

4. A tube of film material according to claim 1, characterized in that the closure tie material is a filament or wire of plastic material, preferably drawn polyethylene, polypropylene, polyamide or polyester.

5. A tube of film material according to claim 1, characterized in that the closure tie material has a breaking strength of at least 20 kg as determined in accordance with German Standard DIN No. 55 834.

6. A tube of film material as defined in claim 1, wherein the pressure for forming said groove-like recess is applied in tying said closure tie about said gathered, softened plastic.

7. A tube of film material according to claim 1, characterized in that the film consists of thermoplastic material, of a fibre-reinforced regenerated cellulose with a thermoplastic coating, or of plasticized regenerated cellulose.

8. A tube of film material according to claim 7, characterized in that the film consists of a fibre-reinforced regenerated cellulose coated with a thermoplastic.

9. A tube of film material as defined in claim 1, wherein said gathered thermoplastic material is softened by one of heating and swelling.

10. A tube of film material as described in claim 9, wherein said recess is formed by softening said film material by warm air, infrared radiation, ultrasonic means, by pre-heating said closure tie, or by solvents or swelling agents.

11. A tube of film material according to claim 1 or 9, characterized in that the closure tie includes a knot disposed in a groove-like recess extending over the entire periphery of the gathered plastic end of the tube.

12. A tube of film material according to claim 1 or 9, characterized in that the closure tie includes a knot disposed in a recess in the gathered plastic end extending over only portions of the tube.

* * * * *

UNITED STATES PATENT AND TRADEMARK OFFICE
CERTIFICATE OF CORRECTION

PATENT NO. : 4,364,511
DATED : December 21, 1982
INVENTOR(S) : Hans-Dieter Wittern and Fred Geyer It is certified that error appears in the above-identified patent and that said Letters Patent is hereby corrected as shown below:

On the title page the following should be inserted:

-- [30] Foreign Application Priority Data
    May 16, 1975  [DE]  Fed Rep Germany.......25 21 846--.

Column 2, line 2, after "course" insert -- also --;
Column 3, line 17, "casing" should read -- casings --;
Column 4, line 34, after "possible" insert -- indirectly --;
Column 7, line 13, "100°C." should read -- 110°C. --.

Signed and Sealed this

Fifth Day of March 1985

[SEAL]

Attest:

DONALD J. QUIGG

Attesting Officer    Acting Commissioner of Patents and Trademarks